(12) United States Patent
Matsubara

(10) Patent No.: US 8,044,995 B2
(45) Date of Patent: Oct. 25, 2011

(54) IMAGE PROCESSOR AND METHOD FOR ADJUSTING IMAGE QUALITY

(75) Inventor: Shogo Matsubara, Musashino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 35 days.

(21) Appl. No.: 12/755,645

(22) Filed: Apr. 7, 2010

(65) Prior Publication Data

US 2010/0328426 A1 Dec. 30, 2010

(30) Foreign Application Priority Data

Jun. 30, 2009 (JP) .................. 2009-155392

(51) Int. Cl.
*H04N 5/52* (2006.01)
*H04N 13/00* (2006.01)
(52) U.S. Cl. ......................................... 348/42; 348/678
(58) Field of Classification Search .................... 348/42, 348/678, 51, 558, 552, 445, 54; 725/135
See application file for complete search history.

(56) References Cited

FOREIGN PATENT DOCUMENTS

| JP | 01-272286 | | 10/1989 |
|---|---|---|---|
| JP | 08-317250 | A | 11/1996 |
| JP | 10-191397 | A | 7/1998 |
| JP | 10-276456 | | 10/1998 |
| JP | 10-322622 | | 12/1998 |
| JP | 2001-119664 | A | 4/2001 |
| JP | 2002-366121 | | 12/2002 |
| JP | 2003-274301 | | 9/2003 |
| JP | 2003-339063 | | 11/2003 |
| JP | 2005-094072 | A | 4/2005 |
| JP | 2007-282077 | | 10/2007 |
| JP | 2008-028902 | | 2/2008 |
| JP | 2008-193349 | | 8/2008 |
| JP | 2009-049808 | | 3/2009 |

*Primary Examiner* — Behrooz Senfi
(74) *Attorney, Agent, or Firm* — Patterson & Sheridan, LLP

(57) ABSTRACT

An image processor includes: an receiving module configured to receive a video signal of a content; an image quality adjusting module configured to adjust image quality of the video signal received by the receiving module using image quality adjustment parameters including at least a contrast-related parameter; a 3D video detecting module configured to determine whether the video signal is of a 3D content; and a control module configured to control the image quality adjusting module to adjust the image quality of the video signal using the contrast-related parameter being set to a second parameter setting for enhancing contrast more than at a first parameter setting, when the video signal is determined to be the 3D content by the 3D video detecting module while the image quality adjusting module is adjusting the image quality using the contrast-related parameter being set at the first parameter setting.

4 Claims, 8 Drawing Sheets

FIG. 3

| MODE | GAMMA CURVE | COLOR TEMPERATURE | COLOR DENSITY | PROCESSING ON OUTLINES | ... |
|---|---|---|---|---|---|
| CINEMA | STANDARD | 6,500 K | STANDARD | WEAK | ... |
| BRILLIANT | ENHANCED | 10,000 K OR HIGHER | HIGH | ENHANCED | ... |
| GAME | STANDARD | 6,500 K | STANDARD | ENHANCED | ... |
| USER SETTING | STANDARD | 6,500 K | STANDARD | STANDARD | ... |
| 3D VIDEO | ENHANCED | 6,500 K | A LITTLE HIGH | ENHANCED | ... |
| ... | ... | ... | ... | ... | ... |

FIG. 7

| MODE | GAMMA CURVE | COLOR TEMPERATURE | COLOR DENSITY | PROCESSING ON OUTLINES | ⋮ |
|---|---|---|---|---|---|
| CINEMA | STANDARD | 6,500 K | STANDARD | WEAK | ⋮ |
| BRILLIANT | ENHANCED | 10,000 K OR HIGHER | HIGH | ENHANCED | ⋮ |
| GAME | STANDARD | 6,500 K | STANDARD | ENHANCED | ⋮ |
| USER SETTING | STANDARD | 6,500 K | STANDARD | STANDARD | ⋮ |
| 3D VIDEO | ENHANCED | 6,500 K | A LITTLE HIGH | ENHANCED | ⋮ |
| CINEMA AND 3D VIDEO | A LITTLE ENHANCED | 6,500 K | STANDARD | WEAK | ⋮ |
| ⋮ | | | | | ⋮ |

IMAGE PROCESSOR AND METHOD FOR ADJUSTING IMAGE QUALITY

CROSS REFERENCE TO RELATED APPLICATION(S)

The present disclosure relates to the subject matters contained in Japanese Patent Application No. 2009-155392 filed on Jun. 30, 2009, which are incorporated herein by reference in its entirety.

FIELD

The present invention relates to an image processor and a method for adjusting image quality of video data.

BACKGROUND

In recent years, an image quality adjusting function and an audio quality adjusting function are generally provided in TV receivers. A user can adjust output video and audio to the user's favorite states using these adjusting functions. Also, TV receivers are widely used, which have an automatic adjusting function for setting the image quality and the sound quality to predetermined preset values of a movie mode, a brilliant mode, or the like according to a category such as a program genre or a video type of the video image.

For example, JP-A-2005-094072 discloses an image quality adjusting technique using a preset mode in which predetermined image/sound quality is set in advance and an equalizing mode in which the image/sound quality is adjusted by the user. In the preset mode, this technique enables learning of the user's favorite adjustment values by making it possible to add, as image/sound quality of a new mode that is correlated with a particular keyword, image/sound quality as adjusted in the equalizing mode.

However, although the publication, JP-A-2005-094072, discloses the function of customizing the image quality adjustment based on a keyword and content-related information as well as the presetting function and the equalizing function which are commonly used in the image quality adjustment, it discloses no image quality adjusting technique for a situation that there are plural categories relating to the program genre, the video type, etc. and one of those categories is three-dimensional (3D) video.

That is, the image quality cannot be adjusted automatically so as to be suitable for 3D video in the case where plural categories exist for video to be subjected to image quality adjustment and one of those categories is video for 3D visual recognition.

BRIEF DESCRIPTION OF THE DRAWINGS

A general configuration that implements the various feature of the invention will be described with reference to the drawings. The drawings and the associated descriptions are provided to illustrate embodiments of the invention and not to limit the scope of the invention.

FIG. 3 is a table showing a specific example of plural pieces of image quality adjustment information used in the first embodiment that are correlated with each of plural video categories.

FIG. 7 is a table showing a specific example of plural pieces of image quality adjustment information used in the second embodiment that are correlated with each of plural video categories.

DETAILED DESCRIPTION OF THE EMBODIMENTS

Figure 1:
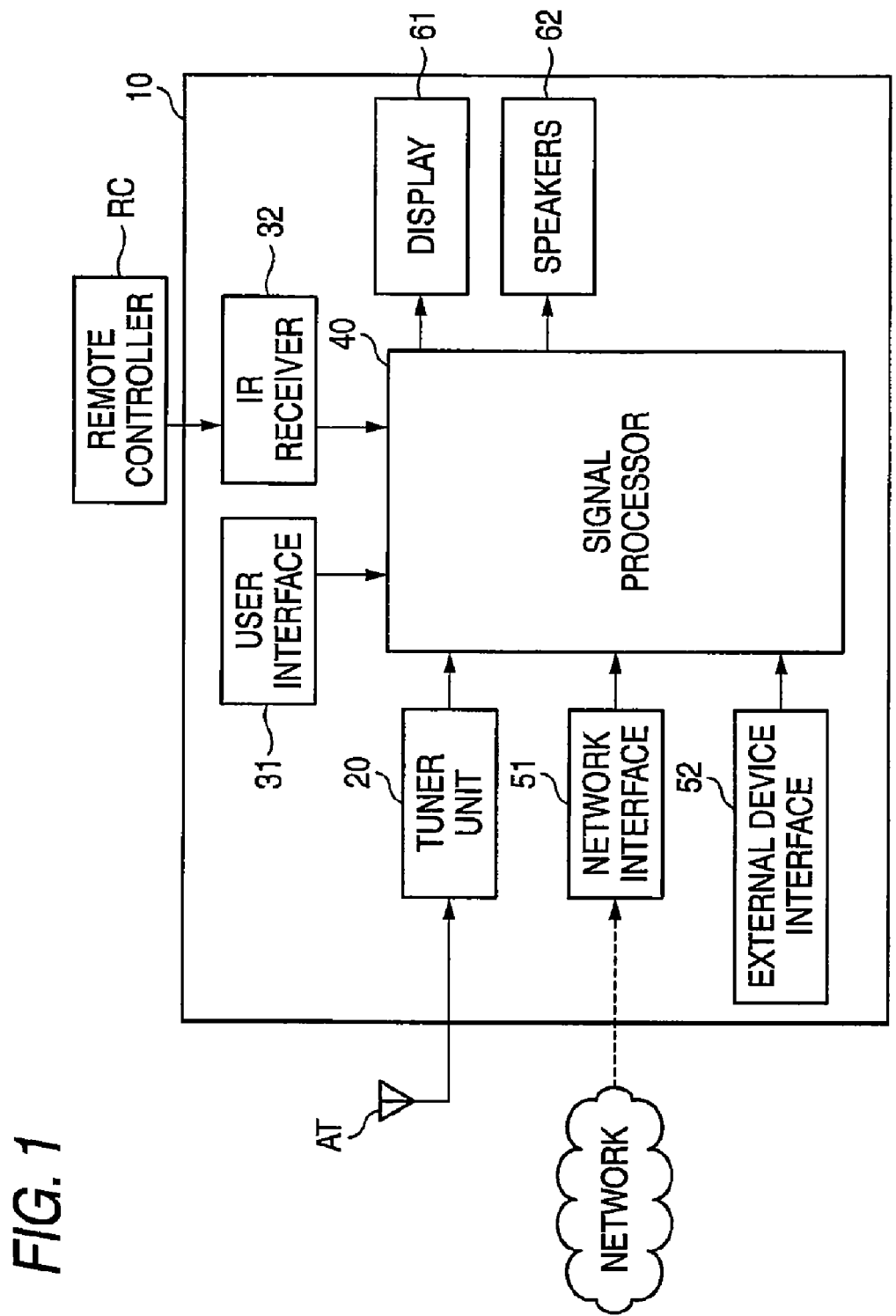
FIG. 1 is a block diagram showing the configuration of a TV receiver which is an image processor according to a first embodiment of the present invention.

Hereinafter, embodiments of the invention will be described with reference to the drawings. In the following description, common reference numerals are assigned to common components and elements throughout the drawings.

First Embodiment

A first embodiment of the present invention will be hereinafter described with reference to the drawings.

FIG. 1 is a block diagram showing the configuration of a TV receiver which is an image processor according to the first embodiment of the invention. Although the first embodiment is directed to a TV receiver, the image processor according to the invention encompasses an HDD recorder, a DVD recorder, a personal computer, a portable mobile terminal, etc. that include the same configuration as the TV receiver according to the first embodiment. The invention can further be applied to, for example, a set-top box which is a broadcast receiving apparatus for receiving radio broadcast, cable broadcast using, for example, the Internet, or the like.

The TV receiver 10 is provided with a tuner unit 20, a user interface 31, an IR receiver 32, a signal processor 40, a network interface 51, an external device interface 52, a display unit 61, and speakers 62.

The TV receiver 10 according to the first embodiment acquires video data of a 3D content such as a program of 3D video (i.e., video for 3D visual recognition) from the tuner unit 20, the network interface 51, the external device interface 52, or the like, subjecting it to various processing in the signal processor 40, and displays 3D video on the display unit 61.

The tuner unit 20 acquires digital broadcast-wave signals or analog broadcast-wave signals received by an antenna AT, selects a signal on a particular channel from the received signals and performs demodulation and decoding processing on it, and outputs video/audio data of the program, data to be used for generating an EPG, and other data to the signal processor 40. In the first embodiment, the tuner unit 20 outputs, to the signal processor 40, video data of a 3D content of a digital broadcast-wave signal or an analog broadcast-wave signal on a particular channel and other data.

The network interface 51 connects to a network such as the Internet, a LAN, or a WAN, acquires video/audio data of a content, data to be used for generating an EPG, and other data that are provided over the network connected to it, and outputs those data to the signal processor 40. When connected to an external storage medium such as an HDD or a memory card via a LAN or the like, the network interface 51 exchanges content video/audio data etc. with the connected storage medium. In particular, the network interface 51 acquires video data of a 3D content and other data that are provided over the connected network, and outputs those data to the signal processor 40.

The external device interface 52 is connected to an external apparatus via a connection terminal that complies with a corresponding one of various standards such as USB and i-LINK, acquires video/audio data of a content, data to be used for generating an EPG, and other data that are provided from the connected external apparatus, and outputs those data to the signal processor 40. When connected to an external storage medium such as an HDD or a memory card via a connection terminal that complies with such a standard as USB and i-LINK, the external device interface 51 exchanges content video/audio data etc. with the connected storage medium. The external device interface 52 acquires video data of a 3D content and other data that are provided from the connected external apparatus, and outputs those data to the signal processor 40.

The user interface 31 receives information of operation commands for operating the TV receiver 10. The receiving section 32 receives information (carried by light) of the operation commands input through a remote controller RC.

The signal processor 40 performs various kinds of processing such as MPEG coding/decoding calculation processing, video signal/audio signal separation processing, processing of extracting particular data from the input data, and decompression processing on compressed data on video/audio data etc. that are input from the tuner unit 20, the network interface 51, the external device interface 52, or the like, and outputs a resulting video signal and an audio signal to the display unit 61 and the speakers 62, respectively. Having a CPU, the signal processor 40 controls plural kinds of processing using modules of itself and modules connected to it.

The signal processor 40 according to the first embodiment outputs, to the display unit 61, 3D video data obtained by performing a predetermined image quality adjustment on input video data of a 3D content that is input from the tuner unit 20, the network interface 51, the external device interface 52, or the like according to a video category that is determined based on the input video data itself or an operation command that is supplied from the user interface 31 or the remote controller RC.

The display unit 61 is a display module for displaying video based on video data that is input from the signal processor 40, and is a flat display such as an LCD (liquid crystal display). The display unit 61 displays 3D video based on video data of a 3D content that is input from the tuner unit 20, the network interface 51, the external device interface 52, or the like.

The speakers 62 output an audio signal that is input from the signal processor 40.

With the above configuration, the TV receiver 10 according to the first embodiment of the invention displays 3D video by performing a predetermined image quality adjustment on input video data of a 3D content according to a video category that is determined based on the input video data itself or an operation command. This processing is mainly performed by the signal processor 40.

Next, modules which are provided in the signal processor 40 according to the first embodiment and execute an image quality adjusting process on input video data according to a determined vide category will be described with reference to FIG. 2.

Figure 2:
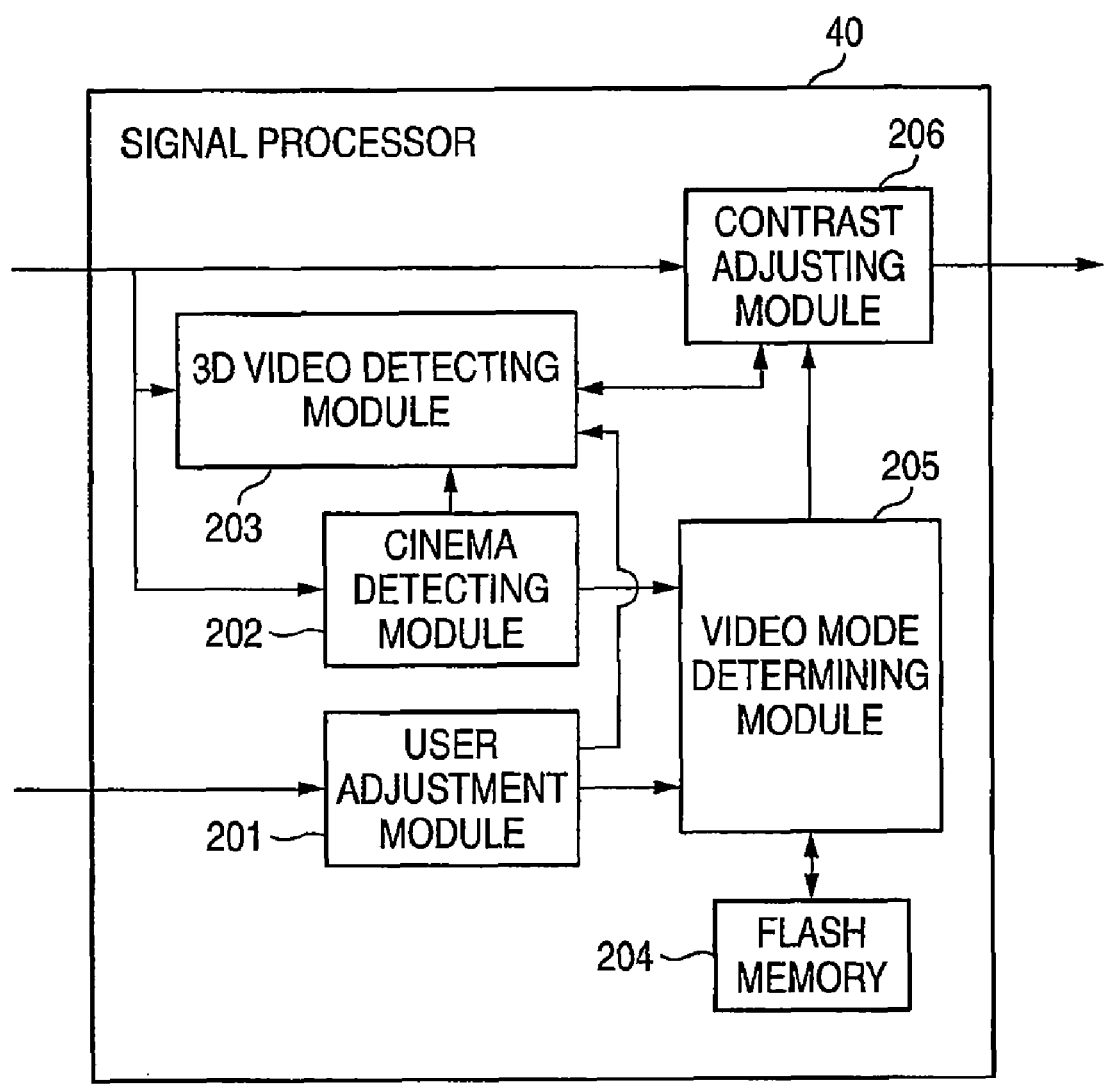
FIG. 2 shows a system configuration of modules which execute an image quality adjusting process according to the first embodiment on input video data according to a determined video category.

FIG. 2 shows a system configuration of modules which execute the image quality adjusting process according to the first embodiment on input video data according to a determined video category.

The signal processor 40 has a user adjustment module 201, a cinema detecting module 202, a 3D video detecting module 203, a flash memory 204, a video mode determining module 205, and a contrast adjusting module 206. The flash memory 204 may be provided outside the signal processor 40 and connected to the signal processor 40.

The user adjustment module 201 outputs, to the 3D video detecting module 203 and the video mode determining module 205, video category information indicating a particular video category based on information corresponding to an operation command that is received through the user interface 31 or the remote controller RC. For example, the video category information is information indicating a particular category (mode) such as a genre, a feature, or a use of video, such as "cinema," "brilliant," "game," or "user setting."

The cinema detecting module 202 determines whether or not video data that is input from the tuner unit 20, the network interface 51, the external device interface 52, or the like is cinema video data by detecting whether or not the input video data has features of cinema video (i.e., video of a movie program (movie content)). If determined that the input video data is cinema video data, the cinema detecting module 202 outputs video category information indicating "cinema" to the 3D video detecting module 203 and the video mode determining module 205. More specifically, the cinema detecting module 202 detects whether or not input video data has features of cinema video by performing, singly or in combination, detection of 24-fps frame rate which is a feature of cinema video, detection of a 2-3/2-2 pull-down signal which is a feature of telecine video, detection of a color temperature that is characteristic of cinema video, and other kinds of detection.

The 3D video detecting module 203 determines whether or not the video data that is input from the tuner unit 20, the network interface 51, the external device interface 52, or the like is 3D video data by detecting whether or not the input video data has features of 3D video. If determined that the input video data is 3D video data and video category information indicating "cinema" from the user adjustment module 201 or the cinema detecting module 202 is received, the 3D video detecting module 203 reads out a contrast setting value of a current adjustment of the contrast adjusting module 206 and outputs, to the contrast adjusting module 206, a new setting value which provides contrast that is enhanced more by a predetermined amount than contrast provided by the read-out setting value.

That is, if input video data has both of features of 3D video and features of cinema video, the 3D video detecting module 203 reads out a current setting value of the contrast adjusting module 206, performs predetermined processing based on the current setting value, and outputs a new setting value to the contrast adjusting module 206.

More specifically, the 3D video detecting module 203 detects whether or not input video data has features of 3D video by performing, singly or in combination, detection of 3D content identification information that is included in coding-related information of the input video data, detection of a 3D-video-specific image format of, for example, a side-byside method which uses the parallax between the two eyes, and other kinds of detection. The 3D video detecting module 203 may use, in addition to the above kinds of detection that are based on the input video data, detection of 3D content identification information from interface protocol information of an HDMI connection with an apparatus which outputs video, detection of a process execution state using its own 2D-3D converting function (i.e., a function of converting general 2D video into a 3D video), or like detection.

The flash memory 204 stores contrast-related setting values which are pieces of image quality adjustment information that are correlated with respective video categories, and outputs image quality adjustment information that is correlated with video category information supplied from the video mode determining module 205. That is, pieces of image quality adjustment information which are particular contrast-related setting values that are correlated with respective video categories are stored. Plural pieces of image quality adjustment information other than a contrast-related setting value, such as setting values relating to color temperature, color density, and processing on outlines, are also correlated with each of the video categories.

The TV receiver 10 may be configured in such a manner that image quality adjustment information to be stored in the flash memory 204 can be changed arbitrarily according to a user operation command from the user interface 31 or the remote controller RC using an OSD picture for changing of image quality adjustment information that is generated by an OSD generating section (not shown).

The flash memory 204 may be in any form as long as it is a nonvolatile, rewritable memory.

The video mode determining module 205 reads, from the flash memory 204, a contrast-related setting value (image quality adjustment information) that is correlated with the video category of video category information that is input from the user adjustment module 201 or the cinema detecting module 202, and outputs it to the contrast adjusting module 206. The video mode determining module 205 may also read the plural pieces of image quality adjustment information other than the contrast-related setting value, such as the setting values relating to color temperature, color density, and processing on outlines, which are correlated with the video category of the input video category information, and output them to corresponding adjusting modules (not shown).

The contrast adjusting module 206 adjusts the contrast (i.e., image quality) of the video data that is input from the tuner unit 20, the network interface 51, the external device interface 52, or the like based on the contrast-related setting value that is input from the video mode determining module 205. More specifically, the contrast adjusting module 206 adjusts the contrast by adjusting the gamma curve, the luminance of the backlight of the LCD, or the like.

The above-configured signal processor 40 according to the first embodiment performs an image quality adjusting process on input video data based on an image quality adjustment setting value that is stored in the flash memory 204 so as to correspond to a video category that is determined based on the input video data or an operation command.

Next, plural pieces of image quality adjustment information used in the first embodiment that are stored in the flash memory 204 so as to be correlated with each of plural video categories will be described below with reference to FIG. 3.

FIG. 3 is a table showing a specific example of plural pieces of image quality adjustment information used in the first embodiment that are correlated with each of plural video categories.

Plural modes (video categories) are defined, and plural pieces of image quality adjustment information (setting values) of such items as a gamma curve (contrast), a color temperature, a color density, and processing on outlines are correlated with each of the plural modes.

For example, in the case of the cinema mode, the setting values of such items as the gamma curve (contrast), the color temperature, the color density, and the processing on outlines are set to "standard," "6,500 K," "standard," and "weak," respectively. By making setting to the pieces of image quality adjustment information of the cinema mode, the image quality is adjusted so that the original color representation of movie content is reproduced.

In the case of the brilliant mode, the setting values of such items as the gamma curve (contrast), the color temperature, the color density, and the processing on outlines are set to "enhanced," "10,000 K," "high," and "enhanced" (edge-enhanced), respectively. By making setting to the pieces of image quality adjustment information of the brilliant mode, the image quality is adjusted so as to produce crisp video that does not fade even in a bright environment.

The setting values of such items as the gamma curve, the color temperature, the color density, and the processing on outlines are likewise employed for each of the other modes such as a game, user setting, and 3D video, and the image quality is adjusted in a suitable manner for each of those video categories.

As mentioned above, the TV receiver 10 may be configured in such a manner that the details of each of the plural pieces of image quality adjustment information can be changed by the user.

Next, specific characteristics of the gamma curve which is one of the image quality adjustment information items shown in FIG. 3 will be described with reference to FIG. 4.

Figure 4:
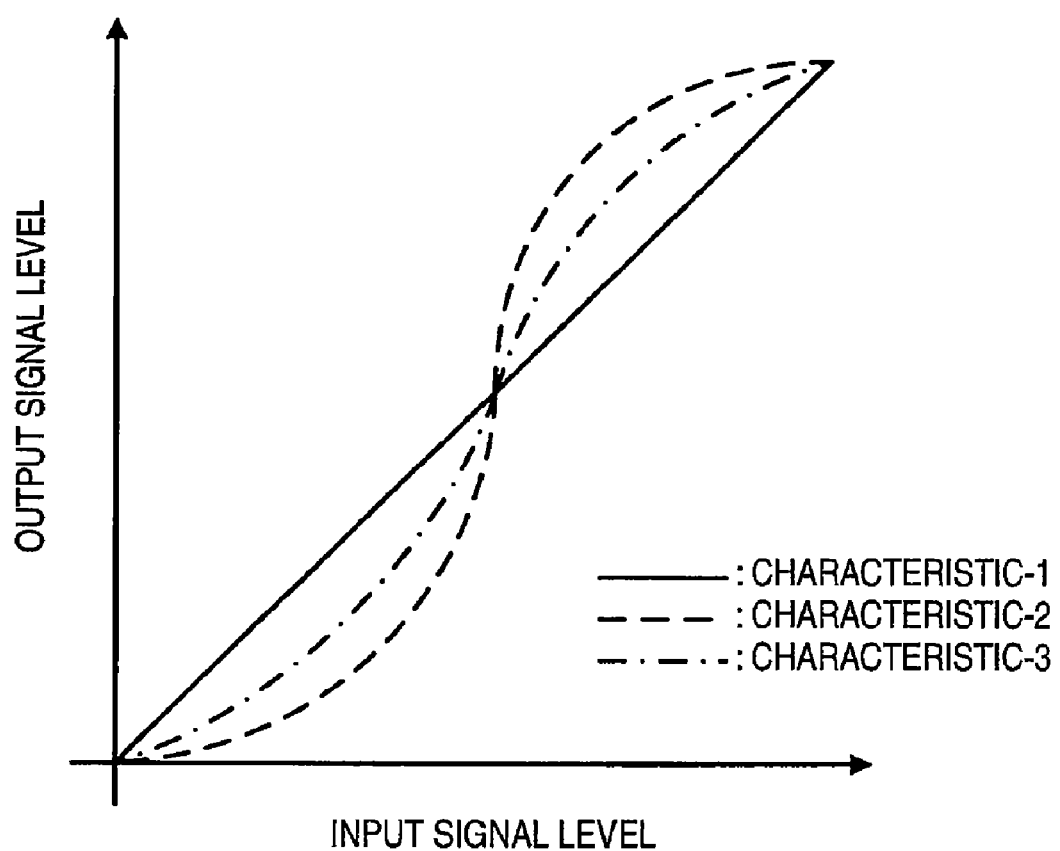
FIG. 4 is a graph showing specific characteristics of a gamma curve which is one of image quality adjustment information items shown in FIG. 3.

FIG. 4 is a graph showing specific characteristics of the gamma curve which is one of the image quality adjustment information items shown in FIG. 3.

Characteristic-1 is a gamma curve of standard contrast for the cinema mode. That is, if an image quality adjustment of the cinema mode is requested from the user adjustment module 201 or the cinema detecting module 202 detects that input video data is cinema video data, the contrast adjusting module 206 employs the gamma curve of characteristic-1 based on the image quality adjustment information corresponding to the cinema mode which is stored in the flash memory 204.

Characteristic-2 is a contrast-emphasizing gamma curve for the brilliant mode. That is, if an image quality adjustment of the brilliant mode is requested from the user adjustment module 201, the contrast adjusting module 206 employs the gamma curve of characteristic-2 based on the image quality adjustment information corresponding to the cinema mode which is stored in the flash memory 204.

Characteristic-3 is a gamma curve for a case that both of the cinema mode and the 3D video mode are established. Assume that the gamma curve of characteristic-1 is employed as described above because an image quality adjustment of the cinema mode has been requested through the user adjustment module 201 or the cinema detecting module 202 has detected that input video data is cinema video data. If in this state the 3D video detecting module 203 detects that the input video data is 3D video data, the 3D video detecting module 203 reads out the setting value corresponding to the gamma curve (characteristic-1) that is currently employed in the contrast adjusting module 206. The 3D video detecting module 203 outputs, to the contrast adjusting module 206, a new setting value which provides contrast that is enhanced more by a predetermined amount than contrast provided by the read-out setting value. The contrast adjusting module 206 employs a gamma curve of characteristic-3 which provides contrast that is enhanced more by the predetermined amount than contrast provided by characteristic-1.

The contrast corresponding to the gamma curve for the case that both of the cinema mode and the 3D video mode are established is in such a range as to be enhanced more by the predetermined amount than contrast corresponding to the gamma curve for the cinema mode and enhanced less than contrast corresponding to the gamma curve for the 3D video mode. That is, the gamma curve for the case that both of the cinema mode and the 3D video mode are established is higher in the degree of S-characteristic than the gamma curve for the cinema mode and is lower in the degree of S-characteristic than the gamma curve for the 3D video mode.

Next, an image quality adjusting process which is executed on input video data by the system configuration according to the first embodiment shown in FIG. 2 according to a determined video category will described with reference to FIG. 5.

Figure 5:
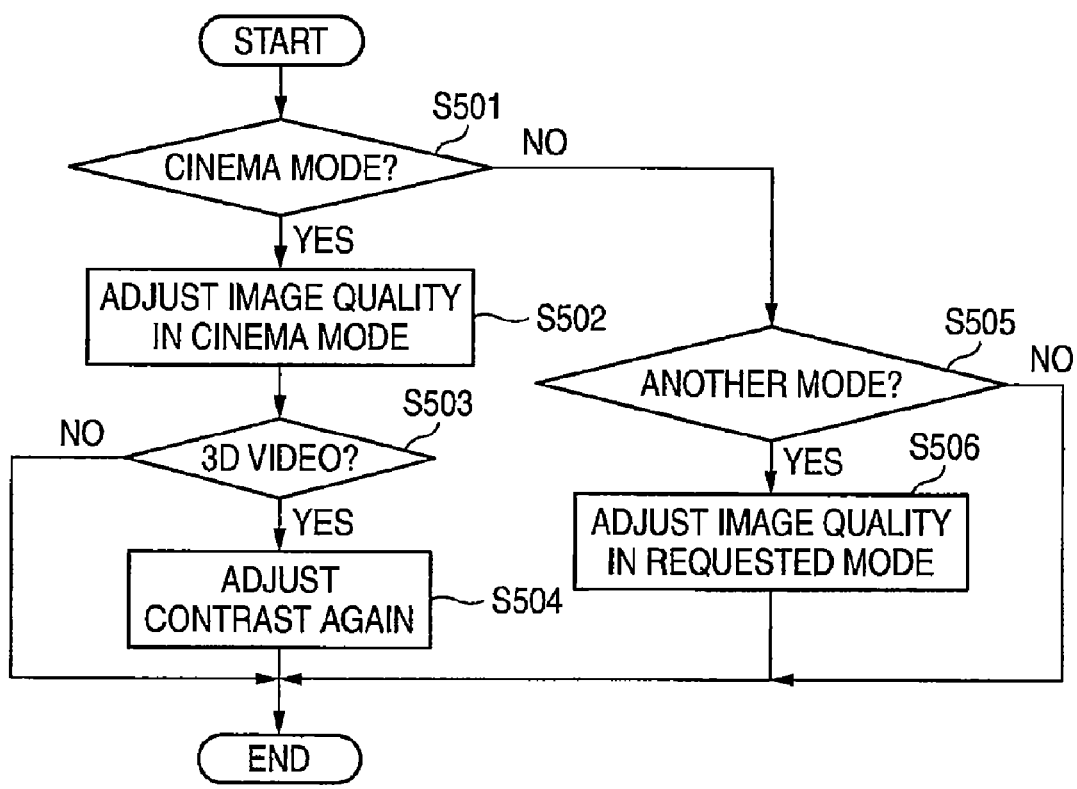
FIG. 5 is a flowchart for detailed description of the image quality adjusting process according to the first embodiment which is executed on input video data according to a determined video category.

FIG. 5 is a flowchart for detailed description of the image quality adjusting process according to the first embodiment which is executed on input video data according to a determined video category.

First, if the user adjustment module 201 requests an image quality adjustment of the cinema mode based on operation command from the user interface 31, the remote controller RC, or the like or the cinema detecting module 202 determines that input video data is cinema video data (S501: yes), at step S502 the video mode determining module 205 reads out the pieces of image quality adjustment information of the cinema mode and outputs the contrast-related setting value to the contrast adjusting module 206 and the contrast adjusting module 206 adjusts the contrast using the setting value of the cinema mode.

If the user adjustment module 201 does not request an image quality adjustment of the cinema mode or the cinema detecting module 202 does not determine that the input video data is cinema video data (S501: no) and if the user adjustment module 201 requests an image quality adjustment of another particular mode (S505: yes), at step S506 the video mode determining module 205 reads out the pieces of image quality adjustment information of that mode and outputs the contrast-related setting value to the contrast adjusting module 206 and the contrast adjusting module 206 adjusts the contrast using the setting value of that mode. If the user adjustment module 201 does not request an image quality adjustment of any other mode (S505: no), the process is finished.

If the 3D video detecting module 203 determines that the input video data is 3D video data (S503: yes) after the contrast adjusting module 206 has adjusted the contrast using the setting value of the cinema mode, at step S504 the 3D video detecting module 203 reads the current contrast-related setting value from the contrast adjusting module 206, performs predetermined processing based on the current contrast-related setting value, and outputs a resulting new setting value to the contrast adjusting module 206 and the contrast adjusting module 206 adjusts the contrast using the new setting value.

If the 3D video detecting module 203 does not determine that the input video data is 3D video data (S503: no) after the contrast adjusting module 206 has adjusted the contrast using the setting value of the cinema mode, the process is finished.

Each of the cinema detecting module 202 and the 3D video detecting module 203 monitors whether the input video data is cinema video data or 3D video data during all the period when the video data is input. The user adjustment module 201 always monitors whether an image quality adjustment of a particular mode is requested. If no mode change is detected by these monitoring operations, no new image quality adjustment is performed and the current adjustment is maintained. A new image quality adjustment is performed if a mode change is detected. Since whether a mode change has been made or not is monitored all the time, the order of the plural mode determining steps shown in the flowchart of FIG. 5 may be changed; their order may be different from the one shown in FIG. 5 as long as the same processing result is obtained.

In the above-described manner, the modules of the signal processor 40 according to the first embodiment execute the image quality adjusting process on input video data according to a determined video category.

As described above, in the first embodiment, if it is detected that input video data is 3D video data in a state that an image quality adjustment of the cinema mode has been performed on the input video data in response to a user request or detection of the fact that the input video data is cinema video data, an image quality adjustment that is suitable for both of cinema video and 3D video is performed using a new setting value obtained by performing predetermined processing based on the current image quality adjustment setting value that is suitable for cinema video. Therefore, adjustment can be made automatically to image quality that is suitable for 3D video in the case where there are plural categories relating to video to be subjected to image quality adjustment and one of those categories is 3D video.

Second Embodiment

Next, modules which are provided in the signal processor 40a according to a second embodiment and execute an image quality adjusting process on input video data according to a determined video category will be described with reference to FIG. 6.

Figure 6:
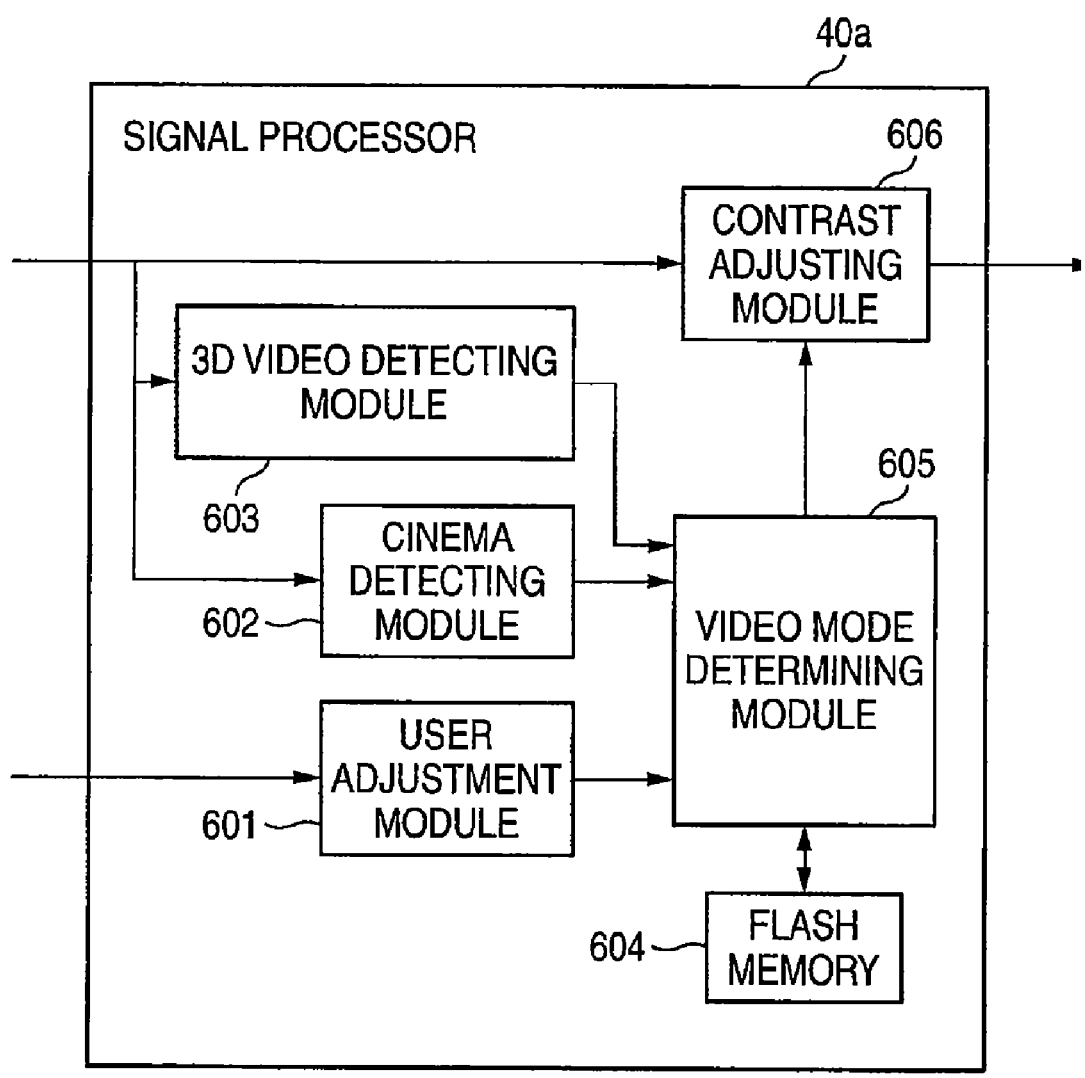
FIG. 6 shows a system configuration of modules which execute an image quality adjusting process according to a second embodiment on input video data according to a determined video category.

FIG. 6 shows a system configuration of modules which execute the image quality adjusting process according to the second embodiment on input video data according to a determined video category.

The modules of the system configuration shown in FIG. 6 operate in approximately the same manners as those of the system configuration shown in FIG. 2. The main difference between the two system configurations is that a 3D video detecting module 603 shown in FIG. 6 outputs information to a video mode determining module 605 whereas the 3D video detecting module 203 exchanges information directly with the contrast adjusting module 206. The other modules operate differently from the corresponding modules shown in FIG. 2 in connection this difference, and hence features relating to this difference will be described below in detail.

The signal processor 40a has a user adjustment module 601, a cinema detecting module 602, the 3D video detecting module 603, a flash memory 604, the video mode determining module 605, a contrast adjusting module 606, etc. The flash memory 604 may be provided outside the signal processor 40a and connected to the signal processor 40a.

The user adjustment module 601 operates in the same manner as the user adjustment module 201 shown in FIG. 2. That is, the user adjustment module 601 outputs, to the video mode determining module 605, video category information indicating a particular video category based on information corresponding to an operation command that is received through the user interface 31 or the remote controller RC.

The cinema detecting module 602 determines whether or not video data that is input from the tuner unit 20, the network interface 51, the external device interface 52, or the like is cinema video data by detecting whether or not the input video data has features of cinema video. If determined that the input video data is cinema video data, the cinema detecting module 602 outputs video category information indicating "cinema" to the video mode determining module 605. The cinema detecting module 602 determines whether or not input video data has features of cinema video by performing the same kinds of detection as the cinema detecting module 202 shown in FIG. 2 does.

The 3D video detecting module 603 determines whether or not the video data that is input from the tuner unit 20, the network interface 51, the external device interface 52, or the like is 3D video data by detecting whether or not the input video data has features of 3D video. If determined that the input video data is 3D video data, the 3D video detecting module 603 outputs video category information indicating "3D video" to the video mode determining module 605. The 3D video detecting module 603 determines whether or not the input video data has features of 3D video by performing the same kinds of detection as the 3D video detecting module 203 shown in FIG. 2 does.

The flash memory 604 stores contrast-related setting values which are pieces of image quality adjustment information that are correlated with respective video categories, and outputs image quality adjustment information that is correlated with video category information received from the video mode determining module 605. Plural pieces of image quality adjustment information other than a contrast-related setting value, such as setting values relating to color temperature, color density, and processing on outlines, are also correlated with each of the video categories.

Image quality adjustment information to be stored in the flash memory 604 may be in such a form that it can be changed arbitrarily according to a user operation command like image quality adjustment information to be stored in the flash memory 204 shown in FIG. 2. The flash memory 604 maybe in any form as long as it is a nonvolatile, rewritable memory.

The video mode determining module 605 reads, from the flash memory 604, an image adjustment contrast-related setting value and image adjustment setting values other than the contrast-related setting value that are correlated with the video category of video category information that is input from the user adjustment module 601, the cinema detecting module 602, or the 3D video detecting module 603, and outputs it to the contrast adjusting module 606 and other corresponding adjusting modules (not shown).

The contrast adjusting module 606 adjusts the contrast (i.e., image quality) of the video data that is input from the tuner unit 20, the network interface 51, the external device interface 52, or the like based on the contrast-related setting value that is input from the video mode determining module 605. More specifically, the contrast adjusting module 606 adjusts the contrast by adjusting the gamma curve, the luminance of the backlight of the LCD, or the like.

The above-configured signal processor 40a according to the second embodiment performs an image quality adjusting process on input video data based on image quality adjustment setting values that are stored in the flash memory 604 so as to correspond to a video category that is determined based on the input video data or an operation command.

Next, plural pieces of image quality adjustment information used in the second embodiment that are stored in the flash memory 604 so as to be correlated with each of plural video categories will be described below with reference to FIG. 7.

FIG. 7 is a table showing a specific example of plural pieces of image quality adjustment information used in the second embodiment that are correlated with each of plural video categories.

The plural pieces of image quality adjustment information used in the second embodiment are approximately the same as those used in the first embodiment. However, the former are different from the latter in that a "cinema and 3D video" mode (video category) is added. Therefore, only differences will be described below.

Specifically, in the case of the cinema and 3D video mode, the setting value of the gamma curve is set to "a little enhanced" which is between "standard" for the cinema mode and "enhanced" for the 3D video mode.

Next, an image quality adjusting process which is executed on input video data by the system configuration according to the second embodiment shown in FIG. 6 according to a determined video category will described with reference to FIG. 8.

Figure 8:
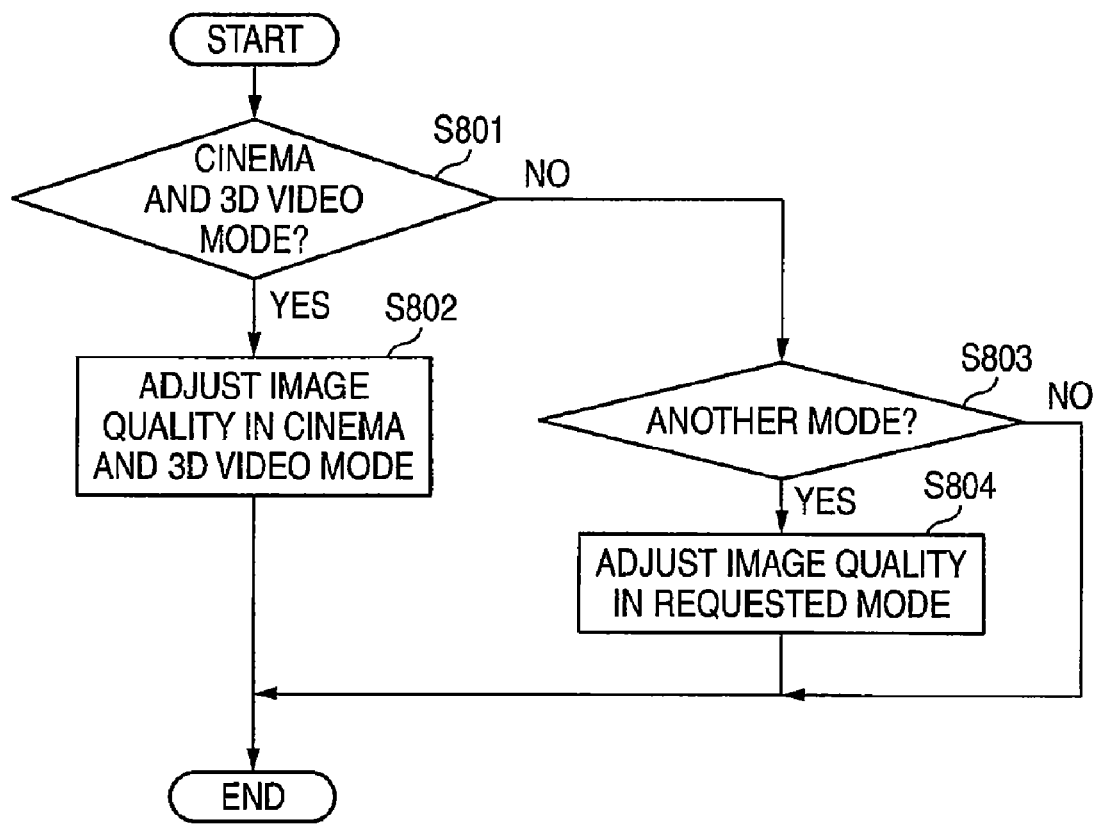
FIG. 8 is a flowchart for detailed description of the image quality adjusting process according to the second embodiment which is executed on input video data according to a determined video category.

FIG. 8 is a flowchart for detailed description of the image quality adjusting process according to the second embodiment which is executed on input video data according to a determined video category.

First, if the user adjustment module 601 requests an image quality adjustment of the cinema mode based on operation command supplied from the user interface 31 or the remote controller RC or the cinema detecting module 602 determines that input video data is cinema video data and if the 3D video detecting module 603 determines that the input video data is 3D video data (S801: yes), at step S802 the video mode determining module 605 reads the pieces of image quality adjustment information of the cinema and 3D video mode from the flash memory 604 and outputs the contrast-related setting value to the contrast adjusting module 606 and the contrast adjusting module 606 adjusts the contrast using the setting value of the cinema and 3D video mode.

On the other hand, if the user adjustment module 601 does not request an image quality adjustment of the cinema mode, the cinema detecting module 602 does not determine that input video data is cinema video data, or the 3D video detecting module 603 does not determine that the input video data is 3D video data (S801: no) and if user adjustment module 601 requests an image quality adjustment of another particular mode (S803: yes), at step S804 the video mode determining module 605 reads out the pieces of image quality adjustment information of that mode and outputs the contrast-related setting value to the contrast adjusting module 606 and the contrast adjusting module 606 adjusts the contrast using the setting value of that mode. If the user adjustment module 601 does not request an image quality adjustment of any other mode (S803: no), the process is finished.

Each of the cinema detecting module 602 and the 3D video detecting 603 monitors whether the input video data is cinema video data or 3D video data continuously while the video data is input. The user adjustment module 601 always monitors whether an image quality adjustment of a particular mode is requested. Therefore, the order of the plural mode determining steps shown in the flowchart of FIG. 8 may be changed; their order may be different from the one shown in FIG. 8 as long as the same processing result is obtained.

In the above-described manner, the modules of the signal processor 40a according to the second embodiment execute the image quality adjusting process on input video data according to a determined video category.

As described above, in the second embodiment, if it is determined that input video data is 3D video data in a state that an image quality adjustment of the cinema mode has been performed on the input video data in response to a user request or detection of the fact that the input video data is cinema video data, an image quality adjustment that is suitable for both of cinema video and 3D video is performed. Therefore, adjustment can be made automatically to image quality that is suitable for 3D video in the case where there are plural categories relating to video to be subjected to image quality adjustment and one of those categories is 3D video.

Each of the signal processors 40 and 40a according to the first and second embodiments can read out video/audio data which is 3D video data from an HDD provided in the TV receiver 10 and perform various kinds of processing according to the invention on the read-out video/audio data.

Although the embodiment according to the present invention has been described above, the present invention is not limited to the above-mentioned embodiment but can be variously modified.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processor comprising:
   a receiving module configured to receive a video signal of a content;
   an image quality adjusting module configured to adjust image quality of the video signal received by the receiving module using image quality adjustment parameters relating to at least a contrast;
   a cinema determining module configured to determine whether the video signal is a video signal of a cinema content;
   a 3D video determining module configured to determine whether the video signal is a video signal of a 3D content; and
   a control module configured to control the image quality adjusting module to adjust the image quality of the video signal using the parameters being set to a first setting that is a setting for a cinema when the cinema determining module determines that the video signal is the video signal of the cinema content, and, controls the image quality adjusting module to adjust the image quality of the video signal using the parameters relating to the contrast being set to a second setting for enhancing contrast more than at the first setting when the 3D video determining module determines that the video signal is the video signal of a 3D content.

2. The image processor of claim 1,
   wherein the control module controls the image quality adjusting module to use the parameters relating to the contrast for the second setting to adjust the contrast to be a second contrast that is between a first contrast according to the first setting and a third contrast according to a third setting corresponding to the 3D content.

3. The image processor of claim 1, wherein the control module controls the image quality adjusting module to maintain using a third setting corresponding to the 3D content when the image quality adjusting module is adjustinq the image quality using the parameters relating to the contrast being set at the third setting and the 3D video determining module determines that the video signal is the video signal of the 3D content.

4. An image quality adjusting method comprising:
   receiving a video signal of a content;
   adjusting image quality of the video signal using image quality adjustment parameters relating to at least a contrast;
   determining whether the video signal is a video of a cinema content;
   determining whether the video signal is a video of a 3D content; and
   adjusting the image quality of the video signal using the parameters relating to the contrast being set to a first setting that is a setting for a cinema, and, adjusting the image quality of the video signal using the parameters relating to the contrast being set to a second setting for enhancing contrast more than at the first setting when the video signal is determined to be the video signal of a 3D content.

* * * * *